United States Patent [19]

Bautze

[11] 4,151,549
[45] Apr. 24, 1979

[54] SIMULATED STEREOSCOPIC TELEVISION PROJECTION SYSTEM

[76] Inventor: Jeff Bautze, 136 Lake Shore Dr., Marlboro, Mass. 01752

[21] Appl. No.: 861,840

[22] Filed: Dec. 19, 1977

[51] Int. Cl.² .......................... H04N 9/54; H04N 9/60
[52] U.S. Cl. ........................................... 358/3; 358/89
[58] Field of Search ............................... 358/3, 88, 89

[56] References Cited

U.S. PATENT DOCUMENTS 3,697,675   10/1972   Beard et al. .......................... 358/3 X

*Primary Examiner*—Robert L. Richardson

[57] ABSTRACT

Television system selectively adaptable to three-dimensional viewing, the system comprising a television set having projector guns disposed thereon and adapted to project color images onto a screen, means for selectively positioning images projected by the projector guns, polarized filters for polarizing light projected from the projector guns, and a pair of eyeglasses including first and second polaroid sheets, each of the polarized filters being movable between a first position in which the filter is disposed between a projection gun and the screen and a second position in which the filter is disposed in an out of the way location.

10 Claims, 2 Drawing Figures

SIMULATED STEREOSCOPIC TELEVISION PROJECTION SYSTEM

BACKGROUND OF THE INVENTION

1. Field of the Invention

This invention relates to the projection and perception of three dimensional images and is directed more particularly to a television system selectively adaptable to three-dimensional viewing.

2. Description of the Prior Art

In stereoscopic motion pictures, three-dimensional realism is achieved by simultaneously projecting two spaced images on a screen. Special glasses are worn by a viewer so that each eye perceives only the corresponding left or right image. Typically, the images are projected using polarized light; the viewing glasses have one horizontally polarized lens to pass one image and one vertically polarized lens to pass the other image. As a result, the viewer senses a three-dimensional picture.

Examples of previous attempts to arrive at a suitable three-dimensional television system appear in U.S. Pat. Nos. 2,388,170, issued Oct. 30, 1945 to H. J. De N. McCollum; 3,165,578, issued Jan. 12, 1965 to F. Lauricella; 3,275,745, issued Sept. 27, 1966 to R. E. Var; 3,621,127, issued Nov. 16, 1971 to Karl Hope; 3,670,097; issued June 13, 1972 to James L. Jones; 3,674,921, issued July 4, 1972 to Alfred Norton Goldsmith; 3,903,358, issued Sept. 2, 1975 to John A. Roese; and 3,697,675, issued Oct. 10, 1972 to Terry D. Beard, et al.

SUMMARY OF THE INVENTION

An object of the present invention is to provide a television system selectively adaptable to three-dimensional viewing and to regular two-dimensional viewing.

A further object of the invention is to provide such a system requiring no transmission system other than that which is presently commercially available.

A still further object of the invention is to provide such a system as will require a minimum of additional expense relative to the manufacture of present television systems.

A still further object of the invention is to provide such a system as will be easy to operate by an operator not studied in electronics or television systems.

With the above and other objects in view, as will hereinafter appear, a feature of the present invention is the provision of a television system selectively adaptable to three-dimensional viewing, the system comprising a television set, first, second, and third projector guns disposed on the set and adapted to project color images onto a screen, the first gun comprising a red color light projection gun, the second gun comprising a green color light projection gun, and the third gun comprising a blue color light projection gun, means for selectively positioning the images projected by the first, second, and third projector guns, a first polarized filter for the first projector gun for polarizing light from the first projector gun vertically, a second polarized filter for the second projector gun for polarizing light from the second projector gun vertically, and a third polarized filter for the third projector gun for polarizing light from the third projector gun horizontally, and a pair of eye glasses including first and second polarized sheets, the first sheet being polarized vertically and the second sheet being polarized horizontally, each of the polarized filters being movable between a first position in which the filter is disposed between its respective projector gun and the screen and a second position in which the filter is disposed in a location removed from its respective projection gun and removed from the light projected therefrom onto the screen.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

DESCRIPTION OF THE DRAWINGS

Reference is made to the accompanying drawings in which is shown an illustrative embodiment of the invention from which its novel features and advantages will be apparent.

DESCRIPTION OF THE PREFERRED EMBODIMENT

Figure 1:
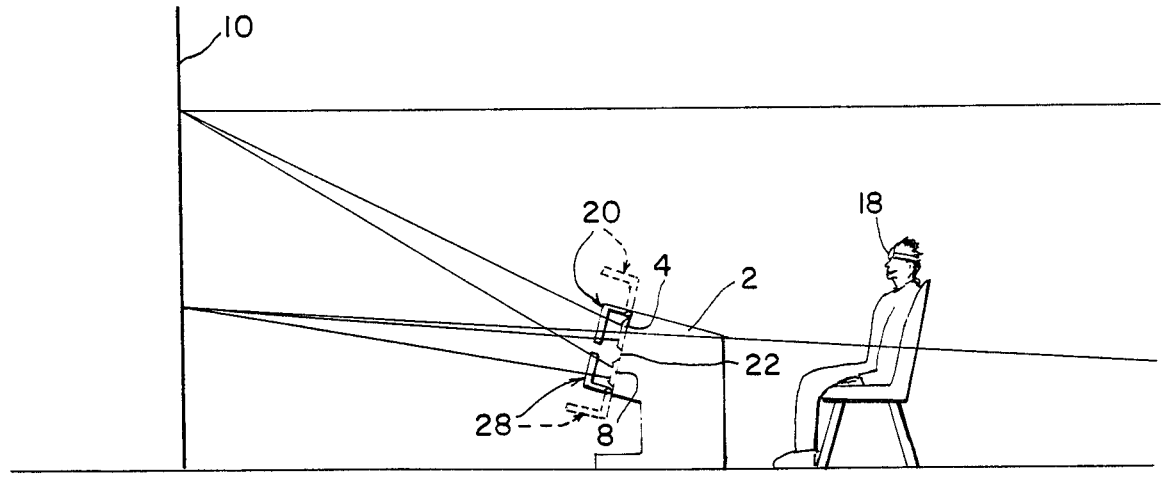
FIG. 1 is an elevational view of one form of television system illustrative of an embodiment of the invention.

Referring to the drawings, it will be seen that the illustrative system includes a projection television set 2 having first, second, and third projector guns 4, 6, 8 disposed on the set 2 and adapted to project color images onto a screen 10. The first gun 4 comprises a red color light projection gun, the second gun 6 comprises a green color light projection gun, and the third gun 8 comprises a blue color light projection gun. The system as described thus far is commercially available and includes means (not shown) for selectively positioning the images projected by the projector guns. Thus, an operator may adjust the positions of the images projected by the guns so as to have the images coincide, to provide a sharp clear two-dimensional image. Alternatively, as will be further described below, the operator may offset an image so as to provide a three-dimensional effect.

A first polarized filter 12 is provided for the first projector gun 4 for polarizing light from the first projector gun vertically. A second polarized filter 14 for the second projector gun 6 is provided for polarizing light from the second projector gun vertically. There is provided a third polarized filter 16 for the third projector gun 8 for polarizing light from the third projector gun horizontally.

The system includes a pair of eye glasses 18 which include first and second polaroid sheets, the first sheet being polarized vertically and the second sheet being polarized horizontally. Such glasses are presently commercially available.

Each of the polarized filters 12, 14, 16 are movable between a first position, shown in solid lines in the drawings, in which the polarized filters are disposed between their respective projector guns and the screen 10 and a second position, shown in phantom in the drawings, in which the filters are removed from their respective projection guns and are removed from the light projected from the guns onto the screen.

Figure 2:
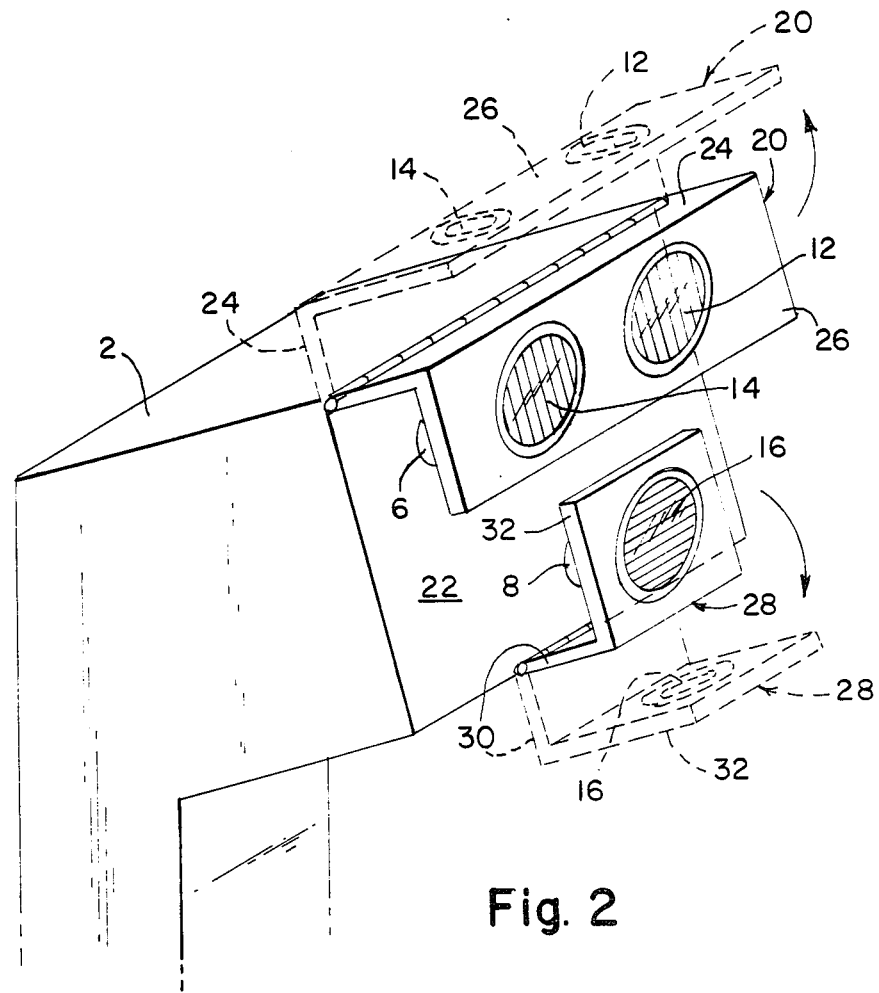
FIG. 2 is a perspective view of portions of the system shown in FIG. 1.

Referring particularly to FIG. 2, it will be seen that the first and second projector guns 4, 6 are disposed in side-by-side relationship, the projector gun 4 being hidden in the drawing behind the filter 12. A first shroud 20 is provided on which are disposed the first and second polarized filters 12, 14, the shroud 20 being movably attached to the set 2 to facilitate movement of the filters between the first and second positions. Preferably, the television set 2 is provided with a mounting surface 22 in which are disposed the projector guns. The first shroud 20 is preferably hingedly connected to an edge of the surface 22. The shroud 20 may include a first portion 24 which in the position shown in solid lines is normal to the surface 22. The shroud 20 further comprises a second portion 26 in which are disposed the polarized filters 12, 14 for alignment with the projector guns 4, 6.

In like manner, there is hingedly attached to the surface 22 on an opposite edge of the set 2 a second shroud 28 which carries the third polarized filter 16. The second shroud 28 includes a first portion 30 which, as shown in solid lines, is movable to a position normal to the surface 22, and a second portion 32 normal to the first portion 30.

Normally, the means for selectively positioning the images projected by the projector guns is disposed in a position causing coincidence of the images, to provide a sharp clear two-dimensional image. To enjoy the three-dimensional aspect of the present invention, it is necessary only that the operator adjust the image positioning means so that the image projected by the projector gun 8 is slightly removed from the images projected by the projector guns 4, 6. The shrouds 20, 28 are then flipped into the position shown in solid lines, so that all projected images are polarized by their respective filters 12, 14, 16. The operator then dons the glasses 18. One eye of the operator then sees only the vertically polarized image and the other eye sees only the horizontally polarized image. As a result, the operator senses a three-dimensional picture.

To return the system to ordinary two-dimensional viewing, it is necessary only that the operator remove the glasses 18, return the image positioning means to normal, and flip the shrouds 20, 28 to the out of the way position shown in phantom in the drawings.

It is to be understood that the present invention is by no means limited to the particular construction herein disclosed and/or shown in the drawings, but also comprises any modifications or equivalents within the scope of the disclosure.

Having thus described my invention what I claim as new and desire to secure by Letters Patent of the United States is:

1. Television system selectively adaptable to three-dimensional viewing, said system comprising a projection television set, first, second, and third projector guns disposed on said set and adapted to project color images onto a screen, said first gun comprising a red color light projection gun, said second gun comprising a green color light projection gun and said third gun comprising a blue color light projection gun, means for selectively positioning said images projected by said first, second, and third projector guns, a first polarized filter for said first projector gun for polarizing light from said first projector gun vertically, a second polarized filter for said second projector gun for polarizing light from said second projector gun vertically, and a third polarized filter for said third projector gun for polarizing light from said third projector gun horizontally, and a pair of eye glasses including first and second polaroid sheets, said first sheet being polarized vertically and said second sheet being polarized horizontally, each of said polarized filters being movable between a first position in which said filter is disposed between its respective projector gun and said screen and a second position in which said filter is disposed in a location removed from its respective projection gun and the respective light projected therefrom onto said screen.

2. The invention according to claim 1 in which said first and second projector guns are disposed in side-by-side relationship.

3. The invention according to claim 2 including a first shroud having said first and second polarized filters disposed therein, said shroud being movably attached to said set to facilitate movement of said filter between said first and second position.

4. The invention according to claim 3 in which said third projector gun is disposed in a position removed from said first and second projector guns.

5. The invention according to claim 4 including a second shroud having said third polarized filter disposed therein, said second shroud being movably attached to said set to facilitate movement of said third filter between said first and second positions.

6. The invention according to claim 5 in which said first and second shrouds are hingedly connected to said set.

7. The invention according to claim 6 in which a mounting surface is disposed in said set and said projector guns extend from said mounting surface.

8. The invention according to claim 7 in which said first and second shrouds are hingedly connected to opposite edges of said mounting surface.

9. The invention according to claim 8 in which said first shroud comprises a first portion which in said first position is normal to said mounting surface and a second portion normal to said first portion.

10. The invention according to claim 9 in which said second shroud comprises a first portion which in said first position is normal to said mounting surface and a second portion normal to said first portion.

* * * * *